(12) United States Patent
Vennelakanti et al.

(10) Patent No.: US 10,510,167 B2
(45) Date of Patent: Dec. 17, 2019

(54) GEOLOGICAL FORMATION AND LOG VISUALIZATION

(71) Applicant: HITACHI, LTD., Tokyo (JP)

(72) Inventors: Ravigopal Vennelakanti, San Jose, CA (US); Christophe Loth, Santa Clara, CA (US); Iwao Tanuma, Tokyo (JP); Anshuman Sahu, Los Gatos, CA (US)

(73) Assignee: Hitachi, Ltd., Tokyo (JP)

( * ) Notice: Subject to any disclaimer, the term of this patent is extended or adjusted under 35 U.S.C. 154(b) by 31 days.

(21) Appl. No.: 15/867,787

(22) Filed: Jan. 11, 2018

(65) Prior Publication Data

US 2019/0213764 A1 Jul. 11, 2019

(51) Int. Cl.
| | |
|---|---|
| *G06T 11/20* | (2006.01) |
| *G06T 11/60* | (2006.01) |
| *G06T 11/00* | (2006.01) |
| *G06F 3/048* | (2013.01) |
| *G01V 1/50* | (2006.01) |
| *G01V 99/00* | (2009.01) |
| *E21B 49/00* | (2006.01) |
| *G06F 3/0484* | (2013.01) |

(52) U.S. Cl.
CPC ............ *G06T 11/206* (2013.01); *E21B 49/00* (2013.01); *G01V 1/50* (2013.01); *G01V 99/005* (2013.01); *G06T 11/001* (2013.01); *G06T 11/60* (2013.01); *G01V 2210/74* (2013.01); *G06F 3/04842* (2013.01); *G06F 3/04847* (2013.01); *G06T 2200/24* (2013.01)

(58) Field of Classification Search
CPC combination set(s) only.
See application file for complete search history.

(56) References Cited

U.S. PATENT DOCUMENTS

| 6,078,869 A | 6/2000 | Gunasekera | |
|---|---|---|---|
| 2003/0015351 A1* | 1/2003 | Goldman | ................ E21B 12/02 |
| | | | 175/39 |

(Continued)

OTHER PUBLICATIONS

"Remedial Priority System", Assigning Categories to the RPS Score, Mar. 2012. www.nj.gov/dep/srp/srra/rps/docs/rps_jenks_breaks.pdf.

(Continued)

*Primary Examiner* — Wesner Sajous
(74) *Attorney, Agent, or Firm* — Mattingly & Malur, PC

(57) ABSTRACT

In some examples, a system may receive log data including a depth-series of data for a sensed parameter. The system may determine a parameter value of the depth series data for individual subunits of depth corresponding to a larger unit of depth. The system may further determine a scale of graphic effects corresponding to parameter values for the depth-series data. The system may present, on a display, a visualization of the depth-series data. For instance, the visualization may include a plurality of cells arranged in a plurality of rows, with each cell corresponding to the larger unit of depth and including a plurality of subcells corresponding to the subunits of depth. Additionally, each subcell may be presented with a respective graphic effect corresponding to the parameter value determined at a corresponding depth, and the graphic effect may correspond to the parameter value on the scale of graphic effects.

20 Claims, 9 Drawing Sheets

(56) References Cited

U.S. PATENT DOCUMENTS

| | | | | |
|---|---|---|---|---|
| 2003/0074139 | A1* | 4/2003 | Poedjono | G01V 1/44 |
| | | | | 702/16 |
| 2008/0162098 | A1* | 7/2008 | Suarez-Rivera | E21B 49/00 |
| | | | | 703/10 |
| 2012/0274664 | A1* | 11/2012 | Fagnou | G06F 3/04855 |
| | | | | 345/660 |
| 2013/0110486 | A1* | 5/2013 | Polyakov | E21B 49/00 |
| | | | | 703/10 |
| 2014/0320126 | A1* | 10/2014 | Heaton | G01V 11/00 |
| | | | | 324/303 |
| 2015/0012219 | A1* | 1/2015 | Selman | E21B 47/06 |
| | | | | 702/9 |
| 2018/0031732 | A1* | 2/2018 | Mosse | G01V 99/005 |
| 2019/0064389 | A1* | 2/2019 | Denli | G06N 3/0454 |

OTHER PUBLICATIONS

Daniel A. Keim, et al., "Pixel bar charts: a visualization technique for very large multi-attribute data sets", Information Visualization (2002) 1, pp. 20-34., www.palgrave-journals.com/ivs.

Extended European Search Report received in corresponding European Application No. 19151216.9 dated Jun. 26, 2019.

\* cited by examiner

400↘

402↘ METADATA

408↗

| VERSION INFORMATION ||
|---|---|
| VERSION | 2.0 CWLS LOG ASCII STANDARD |

410

412

| WELL INFORMATION ||
|---|---|
| START.FT | 9.0000 |
| STOP.FT | 9567.5000 |
| STEP.FT | 0.2500 |
| NULL | -999.2500 |
| COMP | GENERIC OIL & GAS CORP. |
| WELL | GENERIC WELL NAME |
| FIELD | GENERIC FIELD NAME |
| LOC. | GENERIC LOCATION NAME |
| CNTY | GENERIC COUNTY NAME |
| SRVC | SERVICE COMPANY NAME |
| DATE | 2017:07:06:10:41 |
| UWI | UNIQUE WELL IDENTIFIER |
| STATE | NORTH DAKOTA |

414

416

404↘ LOGGED VARIABLES

| CURVE INFORMATION |||
|---|---|---|
| DEPTH.FT | 0 000 00 00: | Depth |
| LINESPEED.FT/MIN | : | Line Speed |
| LINETENS.LB | : | Surface Line Tension |
| ACTDEPTH | : | Actual Depth |
| GR.GAPI | : | Gamma Ray |
| CCL. | : | Casing Collar Locator |

420

422  424  426  428  430  432

PARAMETER INFORMATION

406↘ LOGS

| DEPTH | LSPD | LTEN | ADPTH | GR | CCL |
|---|---|---|---|---|---|
| 20.0000 | -999.2500 | -999.2500 | -999.2500 | -999.2500 | 5.2008 |
| 20.2500 | -29.8800 | -999.2500 | 22.7500 | -999.2500 | -0.3524 |
| 20.5000 | -29.8800 | -999.2500 | 23.0000 | -999.2500 | 0.0833 |
| 20.7500 | -30.7500 | -999.2500 | 23.2500 | -999.2500 | 0.1627 |
| 21.0000 | -30.7500 | -999.2500 | 23.5000 | -999.2500 | -04575 |
| 21.2500 | -31.1300 | -999.2500 | 23.7500 | -999.2500 | 0.2173 |
| 21.5000 | -31.1300 | -999.2500 | 24.0000 | -999.2500 | -0.2963 |
| 21.7500 | -31.3800 | 224.5570 | 24.2500 | 4.8845 | -0.0836 |
| 22.0000 | -31.3800 | 225.5360 | 24.5000 | 4.5316 | -0.3192 |
| 22.2500 | -31.7500 | 226.2288 | 24.7500 | 4.4711 | 0.2005 |
| 22.5000 | -31.7500 | 226.9465 | 25.0000 | 4.7293 | -0.0720 |
| 22.7500 | -32.0000 | 227.6500 | 25.2500 | 5.2639 | 0.5878 |
| 23.0000 | -32.0000 | 226.9991 | 25.5000 | 5.9503 | 0.3610 |
| 23.2500 | -32.2500 | 224.3230 | 25.7500 | 6.5686 | 0.4971 |
| 23.5000 | -32.2500 | 221.0697 | 26.0000 | 6.8628 | -0.4456 |
| 23.7500 | -32.3800 | 218.9166 | 26.2500 | 6.6794 | 0.3659 |
| 24.0000 | -32.3800 | 218.3940 | 26.5000 | 6.0842 | -0.1425 |
| 24.2500 | -32.8800 | 219.9312 | 26.7500 | 5.3471 | 0.4422 |
| 24.5000 | -32.8800 | 223.9750 | 27.0000 | 4.7986 | -1.7990 |
| 24.7500 | -33.0000 | 229.3565 | 27.2500 | 4.6771 | 0.9341 |
| 25.0000 | -33.0000 | 233.4181 | 27.5000 | 5.0584 | -0.3214 |
| ⋮ | ⋮ | ⋮ | ⋮ | ⋮ | ⋮ |

| Formation Key | Description | Depth |
|---|---|---|
| K-P | Cretaceous-Pierre Fm. | 2181 |
| K-GH | Cretaceous-Greenhorn Fm. | 4476 |
| K-M | Cretaceous-Greenhorn Fm. | 4874 |
| K-N | Cretaceous-Greenhorn Fm. | 4983 |
| K-IK | Cretaceous-Greenhorn Fm. | 5264 |
| J-S | Jurassic-Swift Fm. | 5660 |
| J-R | Jurassic-Rierdon Fm. | 6083 |
| T-S | Triassic-Spearfish Fm. | 6618 |
| PM-EBA | Permian-Eroded Broom Creek-Amsden Fm. | 7159 |
| PN-T | Pennsylvanian-Tyler Fm. | 7429 |
| M-EBS | Mississippian-Eroded Big Snowy Group | 7604 |
| M-KL | Mississippian-"Kibbey Lime" | 7904 |
| M-MD | Mississippian-Madison Group | 8069 |
| M-MDR | Mississippian-Ratcliffe Group | 8483 |
| M-MDLS | Mississippian-Base of Last Salt | 8554 |
| M-MDFA | Mississippian-Frobisher-Alida Interval | 8733 |
| M-MDLP | Mississippian-Lodgepole FM | 9327 |

FIG. 5

GEOLOGICAL FORMATION AND LOG VISUALIZATION

BACKGROUND

Well boreholes may be drilled into the earth for locating and accessing fossil fuel deposits, groundwater, and the like, as well as for mineral exploration, geothermal exploration, environmental and geotechnical studies, and so forth. To aid in identifying geological formations, well logs may be generated to provide detailed information of the geological formations penetrated by a borehole, such as for determining the content of the earth adjacent to the borehole. For instance, in petroleum exploration and development, geological formation evaluation based on well logs may be used to determine the ability of a borehole to produce petroleum, and may be further used for determining casing decisions, and the like, which may subsequently affect the stability of an oil well. In some cases, the well log may be generated based on physical measurements made by instruments lowered into the borehole. Conventionally, well logs may be printed out as paper charts, often many feet long, which may be difficult to evaluate. For example, as the depth of boreholes continues to increase, the paper charts are becoming longer, which can lead to loss of spatial context when analyzing the paper charts. Furthermore, comparing such charts of multiple wells concurrently can be cumbersome.

SUMMARY

Some implementations include arrangements and techniques for presenting a visualization of log data. For example, a system may receive log data including a depth-series of data for a sensed parameter. The system may determine a parameter value of the depth series data for individual subunits of depth corresponding to a larger unit of depth. The system may further determine a scale of graphic effects corresponding to parameter values for the depth-series data. The system may present, on a display, a visualization of the depth-series data. For instance, the visualization may include a plurality of cells arranged in a plurality of rows, with each cell corresponding to the larger unit of depth and including a plurality of subcells corresponding to the subunits of depth. Additionally, each subcell may be presented with a respective graphic effect corresponding to the parameter value determined at a corresponding depth, and the graphic effect may correspond to the parameter value on the scale of graphic effects. Additionally, in some examples, an indicator may be included between a first plurality of the rows and a second plurality of the rows to indicate a change in geological formation.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example LAS data structure of an LAS file for a well log according to some implementations.

FIG. 5 illustrates an example of the formation information data structure according to some implementations.

DETAILED DESCRIPTION

Figure 1:
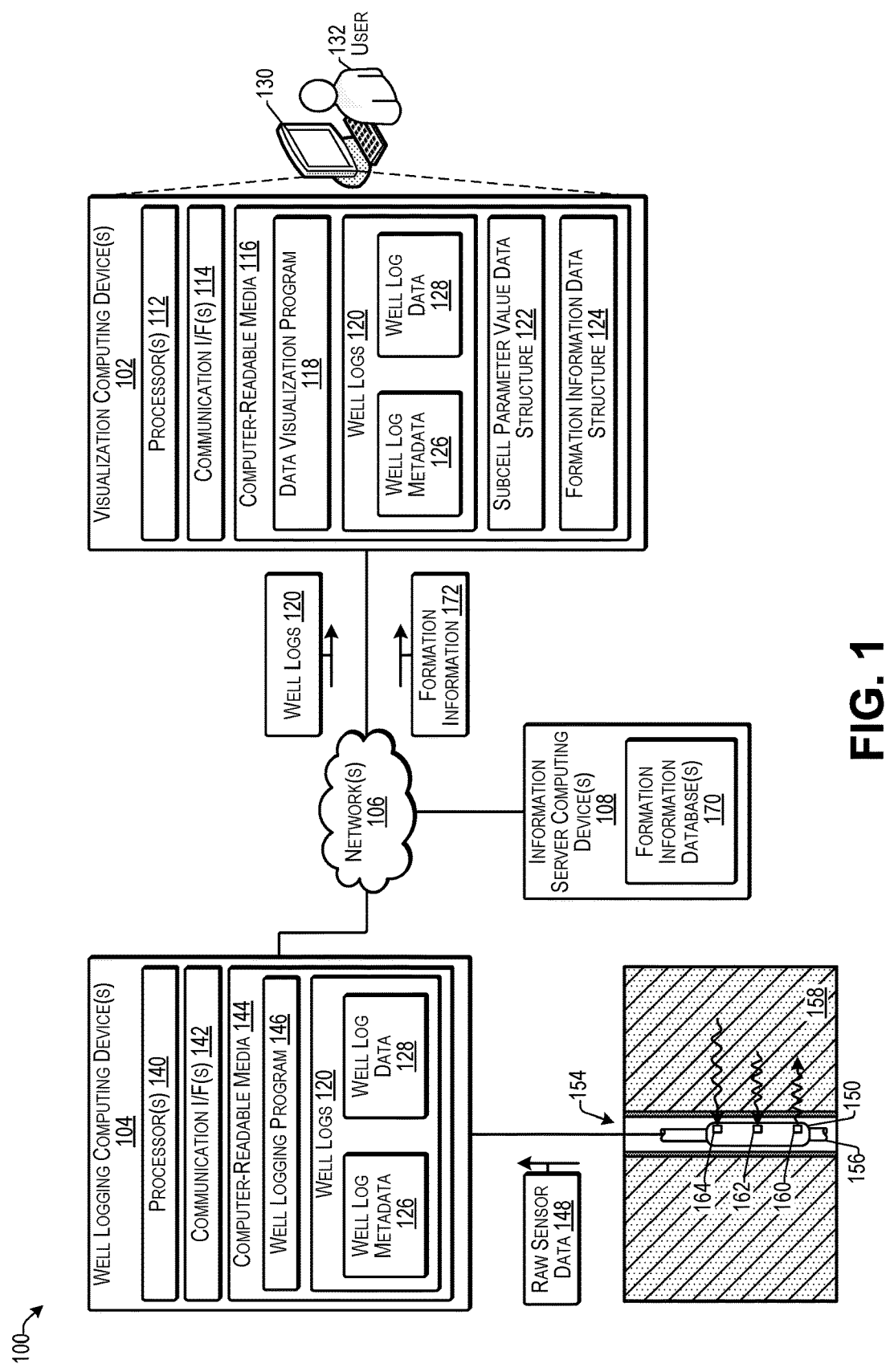
FIG. 1 illustrates an example architecture of a system able to present a log data visualization according to some implementations.

Some implementations herein are directed to techniques and arrangements for efficient and compact cell-based visualization of well log information. The cell-based visualization for well logs described herein is space efficient, retains context, and enables comparison of the results from multiple wells side-by-side concurrently on a single display. For instance, rather than linearly increasing the depth along the y-axis to visualize the well log parameters, as in conventional visualization techniques, implementations herein generate and present a pattern of blocks of cells and subcells in a graphic user interface (GUI).

In some examples, the multiple cells may be grouped or otherwise arranged into multiple blocks of multiple cells. Each block may correspond to an individual geological formation, and the blocks and cells in each block may be ordered in a sequence according to the order in which the formations occur in the earth. Further, each cell may include a plurality of regularly arranged subcells. For instance, each cell and each subcell within each cell may correspond to the parameter information determined for a specified depth. Furthermore, each subcell, and thus, each cell, may include a graphic effect, such as a selected color, a selected pattern, a selected brightness, or the like, that corresponds to a value of the parameter at the specified depth. Thus, the GUI herein provides a compact intuitive view of a well log that conveys meaningful information representative of one or more measured parameters. Further, the GUI may provide a clear indication of the number and location of the different geological formations relative to each other, with demarcations between the respective geological formations.

In some examples, the cell-based visualization herein may be generated based on measured parameters determined from processing raw well log data. The raw data may initially be stored as a Log ASCII Standard (LAS) file or other suitable file type and processed to determine values for the cells and subcells. Additionally, the cell-based visualization may further be generated based on geological formation data that is available, e.g., from a separate table, database, or other geological formation data structure. For example, formation top depths and labels may be determined from the geological formation data structure.

In some cases, the well log may include a parameter that is measured as an amplitude that varies based on the content of the earth detected adjacent to the borehole. The system herein may determine the average amplitude or other average value of the parameter over a specified unit of depth, such as a foot, half foot, tenth of a meter, half meter, etc. The specified unit of depth may correspond to an individual subcell in one of the cells, and each cell may correspond to a larger specified unit of depth, such as 5 feet, 10 feet, 2 meters, 3 meters, etc. For example, each cell may include a plurality of subcells, such as 4, 6, 8, 10, etc. In some cases, the average values of the parameter for each subcell may be determined in advance and stored in a subcell value data structure for the well log to enable the GUI to be generated quickly by accessing the data structure, rather than computing average parameter values each time the GUI is generated.

When the GUI is generated, a graphic effect may be applied to each subcell in each cell in each block to represent the average parameter value for each individual subcell. Examples of graphic effects include different colors for different ranges of parameter values; different patterns, such as cross hatching, stippling, or the like, for different ranges of parameter values; and/or different levels of brightness for different ranges of parameter values. Further, while several examples of graphic effects are described herein, implementations are not limited to any particular type of graphic effect.

Furthermore, in some examples, additional graphic effects may be applied to individual subcells to indicate a trend of the parameter measurement. For example, if the value of the parameter is increasing more than a threshold amount, the subcell may have a first graphic effect applied. If the value of the parameter is decreasing more than a threshold amount, the subcell may have a second graphic effect applied. If the value is neither decreasing nor increasing more than the respective thresholds, no graphic effect might be applied in some cases, or in other cases a third graphic effect may be applied.

For discussion purposes, some example implementations are described in the environment of a computing device that presents a GUI providing a visualization of well log information or the like. However, implementations herein are not limited to the specific examples provided, and may be extended to other types of data, other types of environments, other system architectures, other graphics effects, and so forth, as will be apparent to those of skill in the art in light of the disclosure herein. For instance, the implementations herein may include collecting sensor data (e.g., Gamma Ray (GR) data and/or other parameters) about lithology using various systems such as Logging While Drilling (LWD), Measurement While Drilling (MWD), and so forth. Some examples may be used by oil and gas operators, service providers, researchers, and the like, for visualization of drilling parameter logs, other types of well logs, other types of data, and so forth.

FIG. 1 illustrates an example architecture of a system 100 able to present a log data visualization according to some implementations. The system 100 includes at least one visualization computing device 102 that is able to communicate with at least one well logging computing device 104, such as through one or more networks 106. In addition, the visualization computing device(s) 102 may communicate over the one or more networks 106 with one or more information server computing devices 108.

In some examples, the visualization computing device(s) 102, well logging computing device(s) 104, and/or information server computing device(s) 108 may include one or more servers, personal computers, or other types of computing devices that may be embodied in any number of ways. For example, in the case of a personal computer, the programs, other functional components, and at least a portion of data storage may be implemented on the personal computer and/or may be partially implemented at a network location, such as through cloud-based storage, cloud-based processing, or the like. Alternatively, in the case of a server, the programs, other functional components, and at least a portion of data storage may be implemented on at least one server, such as a stand-alone server, or a server in a cluster of servers, a server farm or data center, a cloud-hosted computing service, and so forth, although other computer architectures may additionally or alternatively be used.

In the illustrated example, the visualization computing device 102 includes, or may have associated therewith, one or more processors 112, one or more communication interfaces (I/Fs) 114, and one or more computer-readable media 116. Each processor 112 may be a single processing unit or a number of processing units, and may include single or multiple computing units, or multiple processing cores. The processor(s) 112 can be implemented as one or more central processing units, microprocessors, microcomputers, microcontrollers, digital signal processors, state machines, logic circuitries, graphics processing units, systems on chips, and/or any devices that manipulate signals based on operational instructions. For instance, the processor(s) 112 may be one or more hardware processors and/or logic circuits of any suitable type specifically programmed or configured to execute the algorithms and processes described herein. The processor(s) 112 may be configured to fetch and execute computer-readable instructions stored in the computer-readable media 116, which can program the processor(s) 112 to perform the functions described herein.

The computer-readable media 116 may include volatile and nonvolatile memory and/or removable and non-removable media implemented in any type of technology for storage of information such as computer-readable instructions, data structures, program modules, or other data. For example, the computer-readable media 116 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the visualization computing device 102, the computer-readable media 116 may be a tangible non-transitory medium to the extent that, when mentioned, non-transitory computer-readable media exclude media such as energy, carrier signals, electromagnetic waves, and/or signals per se. In some cases, the computer-readable media 116 may be at the same location as the visualization computing device 102, while in other examples, the computer-readable media 116 may be partially remote from the visualization computing device 102.

The computer-readable media 116 may be used to store any number of functional components that are executable by the processor(s) 112. In many implementations, these functional components comprise instructions or programs that are executable by the processor(s) 112 and that, when executed, specifically program the processor(s) 112 to perform the actions attributed herein to the visualization computing device 102. Functional components stored in the computer-readable media 116 may include a data visualization program 118. The data visualization program 118 may include one or more computer programs, computer-readable instructions, executable code, or portions thereof that are executable to cause the processor(s) 112 to receive one or more well logs 120 and process the well logs 120 according to the rules defined herein for generating one or more subcell parameter value data structures 122. The data visualization program 118 may further generate a graphic user interface (GUI) (not shown in FIG. 1) from the well log(s) 120, the subcell parameter value data structure 122, and a formation information data structure 124, as described additionally below.

Additional functional components maintained in the computer-readable media 116 of the visualization computing device(s) 102 may include an operating system (not shown in FIG. 1) that may control and manage various functions of the visualization computing device 102. In some cases, the functional components may be stored in a storage portion of the computer-readable media 116, loaded into a local memory portion of the computer-readable media 116, and executed by the one or more processors 112. Numerous other software and/or hardware configurations will be apparent to those of skill in the art having the benefit of the disclosure herein.

In addition, the computer-readable media 116 may store data and data structures used for performing the functions and services described herein. For example, the computer-readable media 116 may store the well logs 120, each of which may include well log metadata 126 and well log data 128. The computer-readable media 116 may further store the subcell parameter value data structure(s) 122 and the formation information data structure 124, as mentioned above.

The visualization computing device 102 may also include or maintain other functional components and data, which may include programs, drivers, etc., and other data used or generated by the functional components. Further, the visualization computing device 102 may include many other logical, programmatic, and physical components, of which those described above are merely examples that are related to the discussion herein.

The visualization computing device 102 may further include or may otherwise be in communication with a display 130 for presenting the GUI including the well log visualization to a user 132. As mentioned previously, the well logs herein may be used by oil and gas operators, service providers, researchers, and the like, such as for visualization of drilling parameter logs, other types of well logs, and other types of data. For instance, in other cases, the techniques herein may be used to present time-series data rather that depth-series data. The user 132 may execute and interact with the data visualization program 118 to cause presentation of the GUI on the display 130.

Additionally, in some examples, a first portion of the operations described herein may be performed by a first one of the visualization computing devices 102, and another portion of the operations may be performed by a second one of the visualization computing devices 102. As one example, one or more first visualization computing devices 102 may execute the data visualization program 118 to access the well logs 120 and generate the subcell parameter value data structure 122, while one or more second visualization computing devices 102 may execute the data visualization program 118 to generate the GUI using one or more corresponding subcell parameter value data structures 122. As one example, the user 132 may use a browser or the like on the second visualization computing device 102 to access the first visualization computing device 102 to cause the GUI to be presented on the display 130, which may be associated with the second visualization computing device 102. Alternatively, as still another example, the visualization computing device 102 and the well logging computing device 104 may be the same computing device. Numerous other variations will be apparent to those of skill in the art having the benefit of the disclosure herein.

The communication interface(s) 114 may include one or more interfaces and hardware components for enabling communication with various other devices, such as over the one or more networks 106. Thus, the communication interfaces 114 may include, or may couple to, one or more ports that provide connection to the network(s) 106 for communicating with the well logging computing device(s) 104, and/or the information server computing device(s) 108. For example, the communication interface(s) 114 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel), direct connections, as well as close-range communications, such as BLUETOOTH®, and the like, as additionally enumerated below.

The one or more networks 106 may include any type of network, including a LAN, such as an intranet; a WAN, such as the Internet; a wireless network, such as a cellular network; a local wireless network, such as Wi-Fi; short-range wireless communications, such as BLUETOOTH®; a wired network including fiber optics, Ethernet, Fibre Channel, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the visualization computing device(s) 102, the well logging computing device(s) 104, and the information server computing device(s) 108 are able to communicate over the one or more networks 106 using wired or wireless connections, and combinations thereof.

The well logging computing device(s) 104 may include one or more processors 140, one or more communication interfaces 142, and one or more computer-readable media 144. In some examples, the well logging computing device(s) 104 may have a hardware configuration similar to the visualization computing device(s) 102 discussed above. For example, the one or more processors 140 may include any of the examples of processors 112 discussed above, the one or more communication interfaces 142 may include any of the examples of communication interfaces 114 discussed above, and the one or more computer-readable media 144 may include any of the examples of computer-readable media 116 discussed above.

The computer-readable media 144 on the well logging computing device(s) 104 may include a well logging program 146 for generating one or more of the well logs 120. For example, the well logging program 146 may receive raw sensor data 148 from a well logging device 150 that may be inserted into a borehole 154. In the illustrated example, the well logging device 150 is attached to a drill string 156, and may perform sensing operations while the drill string 156 is used for drilling the borehole 154. In other examples, the well logging device 150 may be inserted into the borehole 154 after the borehole 154 has been drilled. The well logging device 150 may include various types of sensors for detecting well parameters, e.g., parameters of the earth 158 adjacent to the borehole 154.

In some examples, the well logging device 150 may include a gamma ray emitter 160, such as with a radioactive source (e.g., Cs-137, Co-60, or the like), that emits gamma rays into the earth 158 for measuring density or the like. The well logging device 150 may further include one or more sensors 162, 164, such as short range sensor 162 and a longer range sensor 164 that detect gamma rays not absorbed by the earth 158. In some cases, the short range sensor 162 may be used to determine the effects of the casing or other well materials, if any, on the longer range sensor 164. The gamma rays may enter the surrounding earth and rocks where some of the rays are absorbed and others are reflected back to the sensors 162, 164.

As one non-limiting example, suppose the well logging device 150 includes a Cs-137 gamma ray source, which irradiates the formation with 662 keV gamma rays. These gamma rays may interact with electrons in the formation through Compton scattering and lose energy. Once the energy of the gamma ray has fallen below 100 keV, photoelectric absorption dominates, i.e., gamma rays are eventually absorbed by the formation. The amount of energy loss by Compton scattering may be related to the number electrons per unit volume of formation. In some cases, the gamma ray energy loss may be related to the amount of matter per unit volume, i.e., formation density.

The gamma ray sensors 162 and 164 may detect surviving gamma rays and the detected gamma rays may be sorted into several energy windows. The quantity of higher-energy gamma rays detected may correspond to formation density. The quantity of lower-energy gamma rays may correspond to the average atomic number of the formation, and thus, may indicate lithology. Because there may be a large contrast between the density of the minerals in the formation and the density of porous fluids, porosity may be derived from measured formation bulk density.

Additionally, in other examples, other types of well-logging devices 150 may be used. For example, rather than including a gamma ray emitter 160 on the well logging device 150, the well logging device 150 may instead be configured to detect naturally occurring gamma radiation to characterize the rock or sediment adjacent to the borehole 154. For example, different types of rock may emit different amounts and different spectra of natural gamma radiation. For instance, shales may emit more gamma rays than other sedimentary rocks, such as sandstone, gypsum, salt, coal, dolomite, or limestone because radioactive potassium is a common component in the content of formations including shale. The difference in radioactivity between shales and sandstones/carbonate rocks, etc., allows the well logging device 150 to be used to distinguish between shales and non-shales. Thus, the presence or absence of gamma rays in a borehole may be an indication of the amount of shale in the surrounding formation.

The information server computing device(s) 108 may include one or more web servers or other computing devices, such as discussed above, and may include or may access one or more formation databases 170. In some examples, the information server computing device(s) 108 may be accessed by the visualization computing device 102 to obtain formation information 172, which may be downloaded and stored in the formation information data structure 124. The data visualization program 118 may then access this formation information data structure 124 when generating the GUI on the display 130. In other examples, the data visualization program 118 may access the formation information database(s) 170 on the information server computing device(s) 108 when generating the GUI, rather than receiving the formation information 172 in advance. In some cases, the information server computing device 108 may be publicly available, while in other cases, the information server computing device may be private and/or may be accessible based on payment of a fee or the like.

Figure 2:
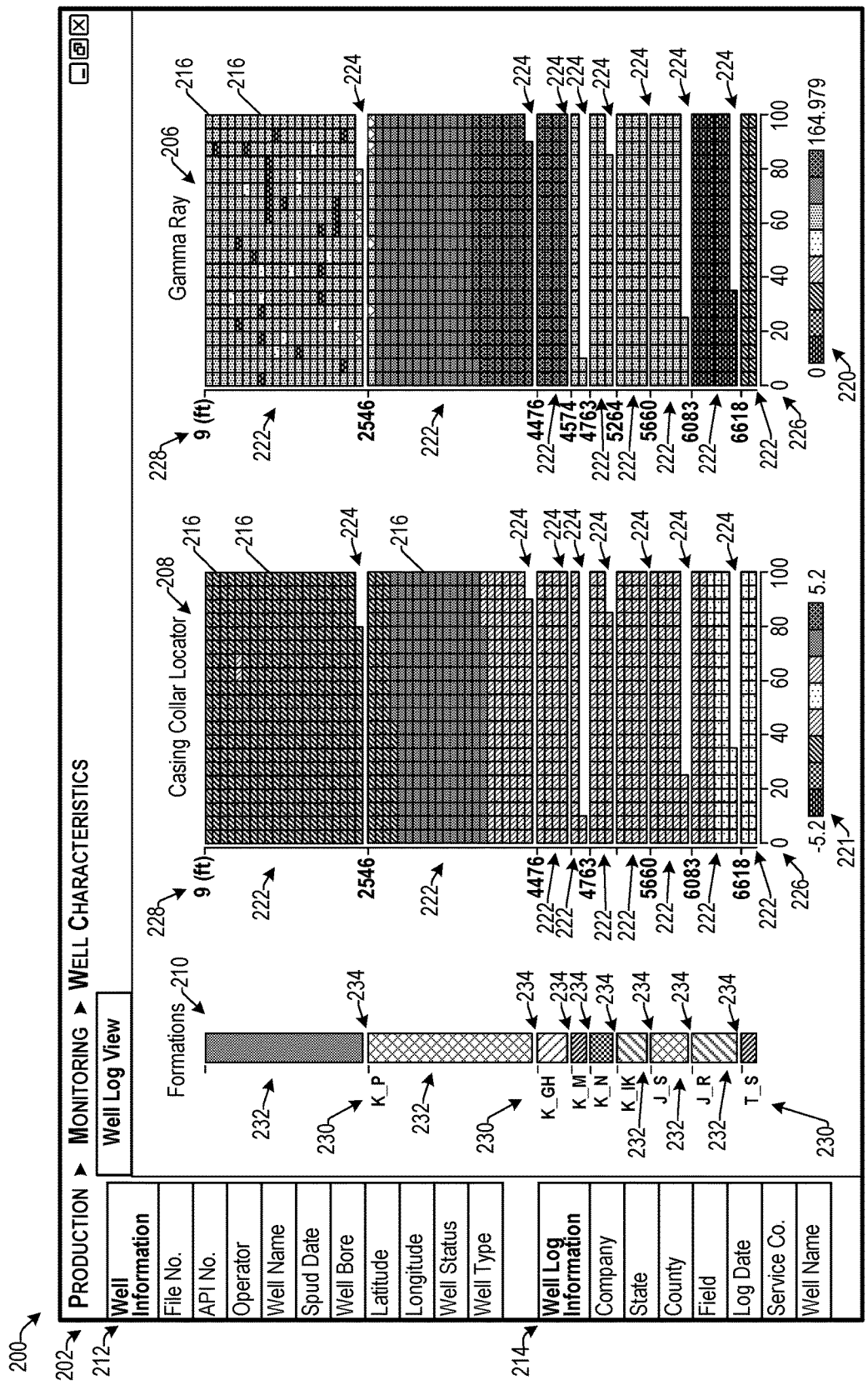
FIG. 2 illustrates an example GUI that may be generated for visualizing data according to some implementations.

FIG. 2 illustrates an example GUI 200 that may be generated for visualizing data according to some implementations. The GUI 200 provides ways to visualize sensor data collected from well boreholes, such as gamma ray measurements used to determine density and porosity of the geological structures adjacent to the borehole. In this example, the GUI 200 includes well log metadata 202, two well log visualizations 206 and 208, and a formation type visualization 210 of well log data for a single selected well. The well log metadata 202 includes well information metadata 212 and well log metadata 214. The well information metadata 212 may include a file number of the well log(s) for the well and American Petroleum Institute (API) units. The gamma ray API unit is defined as 1/200 of the difference between the count rate recorded by a logging tool in the middle of the radioactive bed and that recorded in the middle of the nonradioactive bed.

Additional well information metadata 212 may include the name of the well operator, the well name, the spud date, a well bore description, latitude and longitude of the well, well status (e.g., active or inactive), and well type. Furthermore, the well log information metadata 214 may include the company managing the well, the state and county in which the well is located, the name of the field in which the well is located, the log date, the service company that provided the well log, and the well name. Furthermore, while several types of metadata are illustrated in the example of FIG. 2, additional or alternative types of metadata may in be included in other examples, as will be apparent to those of skill in the art having the benefit of the disclosure herein.

The example GUI 200 of FIG. 2 further includes the two well log visualizations 206, 208, and a formation type visualization 210 for the identified well. The well log visualization 206 provides a visual depiction of gamma ray data from a gamma ray well log generated using the techniques discussed above. Further, the well log visualization 208 provides a visual depiction of a casing collar locator (CCL) log. In well logging, the CCL log may be used for depth control. When combined with a gamma ray log, the CCL log allows depth correlation of a cased-hole logging run with open-hole logs, which enables subsequent downhole operations such as perforating. In some cases, the CCL log may serve as a primary depth control for cased holes and may enable the log output to be correlated with previous logs and known casing features.

The well log visualizations 206 and 208 each include a plurality of cells 216. Each cell 216 may be representative of specified unit of depth. Further, each cell 216 may include a plurality of subcells (not shown in FIG. 2 for clarity of illustration) corresponding to a smaller unit of depth. In the well log visualization 206, each cell 216 (or subcell in other examples) has a graphic effect applied based on a value of the gamma ray radiation measured at the corresponding depth. Similarly, in the well log visualization 208, each cell 216 (or subcell in other examples) has a graphic effect applied based on a value of the CCL measurement at the corresponding depth. Examples of graphic effects may include at least one of a selected color, a selected pattern, a selected brightness, or the like, that corresponds to a value of the gamma ray radiation as set forth in a scale 220. Similarly, the CCL visualization 208 may have its own scale 221. Thus, for each visualization 206, 208, the respective scale 220, 221 may be determined based on the range of values of the parameter being presented. Further, the scale 220 for gamma ray visualization 206 may have the same graphic effects or may have different graphic effects as the scale 221 for the CCL visualization 208.

In addition, the cells 216 are arranged in a series of rows and columns to create blocks 222 of the cells 216. Each block 222 may correspond to an individual geological formation, and the blocks 222 and cells 216 in each block 222 may be ordered in a sequence according to the order in which the geological formations occur in the ground. The continuity of the cell layout may be broken at the start of each subsequent formation top so that cells belonging to the same formation are grouped into the same single block 222 of cells. A gap or break 224 is inserted between two adjacent blocks 222 as an indicator to visually indicate the end of one formation and the beginning of the next formation or otherwise to indicate a change in formation. Thus, each block 222 of cells 216 may represent a different formation. Further, while a break 224 is used as an indicator of a change in formation in this example, in other examples, other types of indicators may be used, such as a bolded line, different colored line, and so forth.

In addition, the overall width of the well log visualizations 206, 208 may be set to a default width (e.g., 100 feet in this example, as indicated by width scale 226) and may be configurable by a user depending on the depth interval desired to be represented in a single row. For example, in the default case, each row corresponds to 100 feet of depth, each cell may correspond to 5 feet of depth, and each subcell may correspond to ½ foot of depth. Accordingly, in the illustrated example, each row includes 20 cells, with each cell including 10 subcells in a two-layer configuration (not shown in FIG. 2 for clarity of illustration). Further, a vertical depth scale 228 may be included on the side of each well log visualization 206, 208 to indicate the depth at which each new formation begins, corresponding to the start of a next block 222 following a break 224. Thus, the GUI 200 herein provides a compact intuitive view of well log data that conveys meaningful information representative of one or more measured parameters. In addition, the GUI 200 provides a clear indication of the number and location of the different geological formations relative to each other.

The formation visualization 210 includes formation labels 230 that identify the name and description of each formation at the beginning of the respective formation. Further, the formation visualization includes blocks 232 having a height that matches the height of the respective blocks 222 in the well log visualizations 206 and 208. The blocks 232 may be separated by gaps 234 that match the breaks 224 between the blocks 222 in the well log visualizations 206 and 208. Further, each of the blocks 232 may include a graphic effect, such as at least one of a color, pattern, level of brightness, or the like. As one example, the graphic effect in each block 232 may corresponding to a predominant graphic effect of the corresponding well log block 222 (e.g., based on taking an average of the parameter over the entire block 222). Alternatively, the blocks 232 may have a graphic effect that is unrelated to the well log parameters, and is instead related to a different parameter, such as formation type. For example, different formation types may be assigned different graphic effects.

Furthermore, while the example GUI 200 of FIG. 2 includes multiple visualizations of multiple well logs corresponding to a single well, in other examples, the GUI 200 may be configured to present visualizations of logs from two or more different wells to enable side-by-side comparison of the parameters of the different wells, as discussed additionally below. Accordingly, implementations herein are not limited to the specific examples illustrated and described herein.

Figure 3:
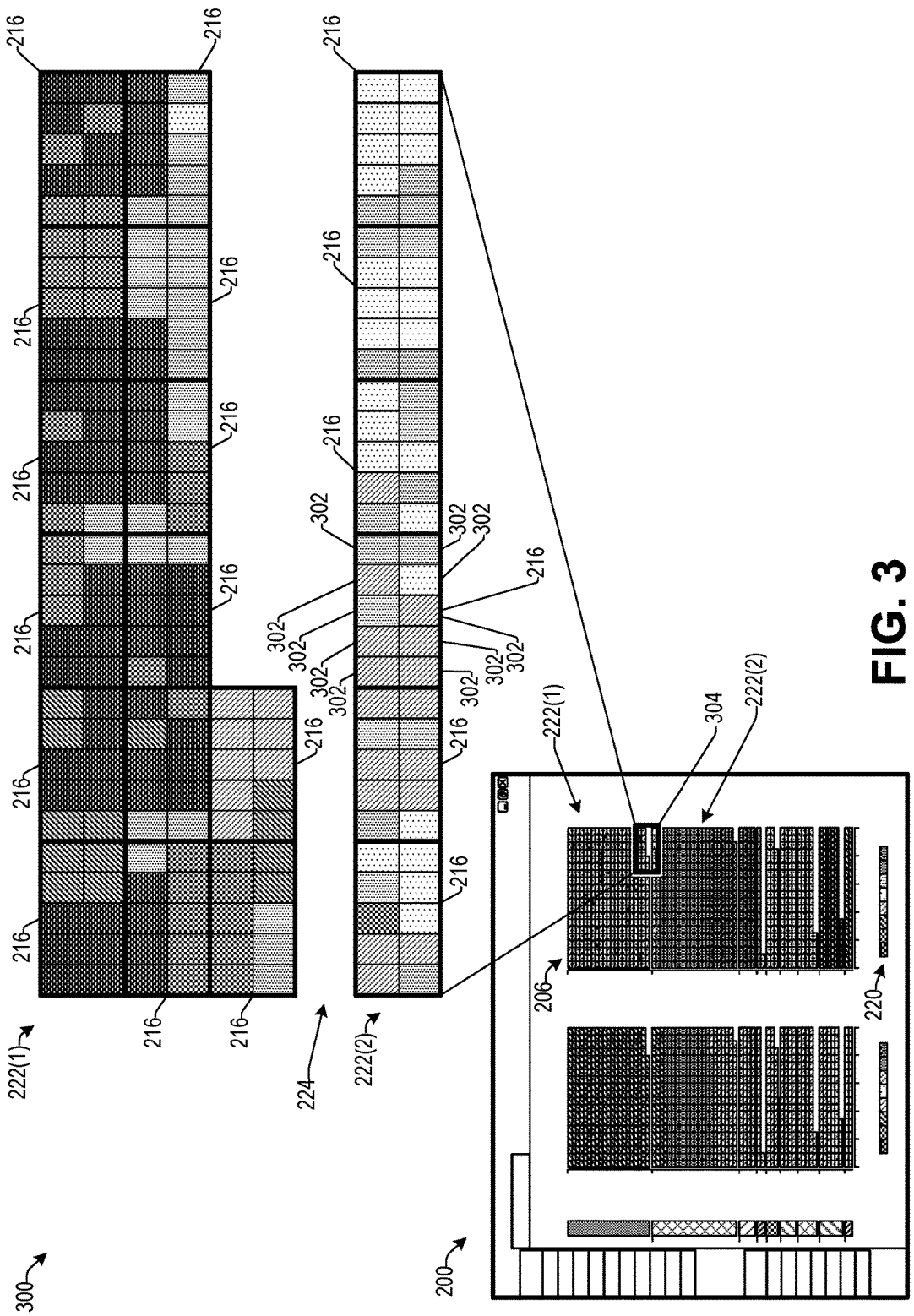
FIG. 3 illustrates an enlarged view of a log data visualization including details of individual subcells within individual cells according to some implementations.

FIG. 3 illustrates an enlarged view 300 of a log data visualization including details of individual subcells within individual cells according to some implementations. As mentioned above, each cell 216 may include a plurality of subcells 302. In this example, each cell 216 includes 10 subcells 302, with an upper row of five subcells 302 and a lower row of five subcells 302 in each cell 216. Additionally, in other examples, the number of subcells may be 2, 4, 6, 8, 12, or so forth. Alternatively, in other examples, there may be a single row of subcells 302 per cell 216, and thus an odd or even number of subcells 302 per cell.

In some cases, the number of subcells 302 per cell 216 may correspond to units of measurement (e.g., depth) used for determining sensor data windows. For instance, if each cell corresponds to five feet of a depth-series signal (i.e., a parameter as measured while the well logging device moves 5 feet within the well borehole), then each subcell may correspond to 0.5 feet, e.g., the average of the parameter as measured over the corresponding 0.5 feet of depth in some examples. As another example, if each cell 216 corresponds to 2.5 meters of depth, then each subcell 302 may correspond to 25 cm of depth. Thus, each cell 216 may correspond to a first unit of depth and each subcell 302 may correspond to a subunit that is an equal subdivision of the unit of depth.

In this example, the enlarged view 300 corresponds to a rectangle 304 shown on the GUI 200 overlapping the visualization 206 discussed above with respect to FIG. 2. The rectangle 304 overlaps a first block 222(1) and a second block 222(2) of the visualization 206. The enlarged view 300 further shows that there is a break 224 between the last row of the first block 222(1) and the first row of the second block 222(2), which serves as an indicator to indicate that the first row of the second block 222(2) is the beginning of a new (different) geological formation. As mentioned above, and as discussed additionally below, the graphic effect selected for each subcell 302 may correspond to a parameter value measured at the depth corresponding to the respective subcell 302, which may also be indicated by the scale 220 or other scale corresponding to the respective log visualization.

FIG. 4 illustrates an example LAS data structure 400 of an LAS file for a well log according to some implementations. For instance, the raw data for a well may be converted to one or more LAS files. A single LAS file may contain one type of data obtained from a well borehole, or may contain any number data sets (also referred to as "curves") from the borehole. Common curves found in a LAS file may include natural gamma, travel time, or resistivity logs. Accordingly, the LAS file data structure may include metadata 402 and log data including logged variables 404 and logs 406.

The metadata 402 may include version information 408, which may include an indication of a version 410 of the Canadian Well Logging Society (CWLS) LAS file being used. The metadata 402 may further include well information 412, such as a start depth, a stop depth, a measurement step size, a null value indicator, a company name, a well name, a field name, a location name, a county name, a service company name, a date, a unique well identifier, and a state in which the well is located, as indicated at 414. The null value may be inserted into the log data to take the place of missing data.

In addition, the logged variables 404 may include curve information 416 that lists the included curves, such as a depth, line speed, line tension, actual depth, gamma ray, and CCL. In addition, the logs 406 may include parameter (attribute) information 420, i.e., the measured data or received sensor data, which in this example includes measurements for depth as indicated at 422, line speed as indicated at 424, line tension as indicated at 426, actual depth as indicated at 428, gamma ray data as indicated at 430, and CCL data as indicated at 432. Furthermore, while certain measured parameters are shown and described in this example, in other examples, other parameters may be included in the LAS file data structure 400, as enumerated elsewhere herein.

FIG. 5 illustrates an example of the formation information data structure 124 according to some implementations. In this example, the formation information data structure 124 includes a formation key 502, a formation description 504, and a formation depth 506. For example, the formation information data structure 124 may be determined for a particular location of a particular well, and may be based on information obtained from a formation database such as may be available from the United States Geological Survey or other public or private databases. The formation key 502 for each respective formation may be included in the GUIs described herein, such as at the corresponding depth to indicate the start of a new formation (formation top).

Figure 6:
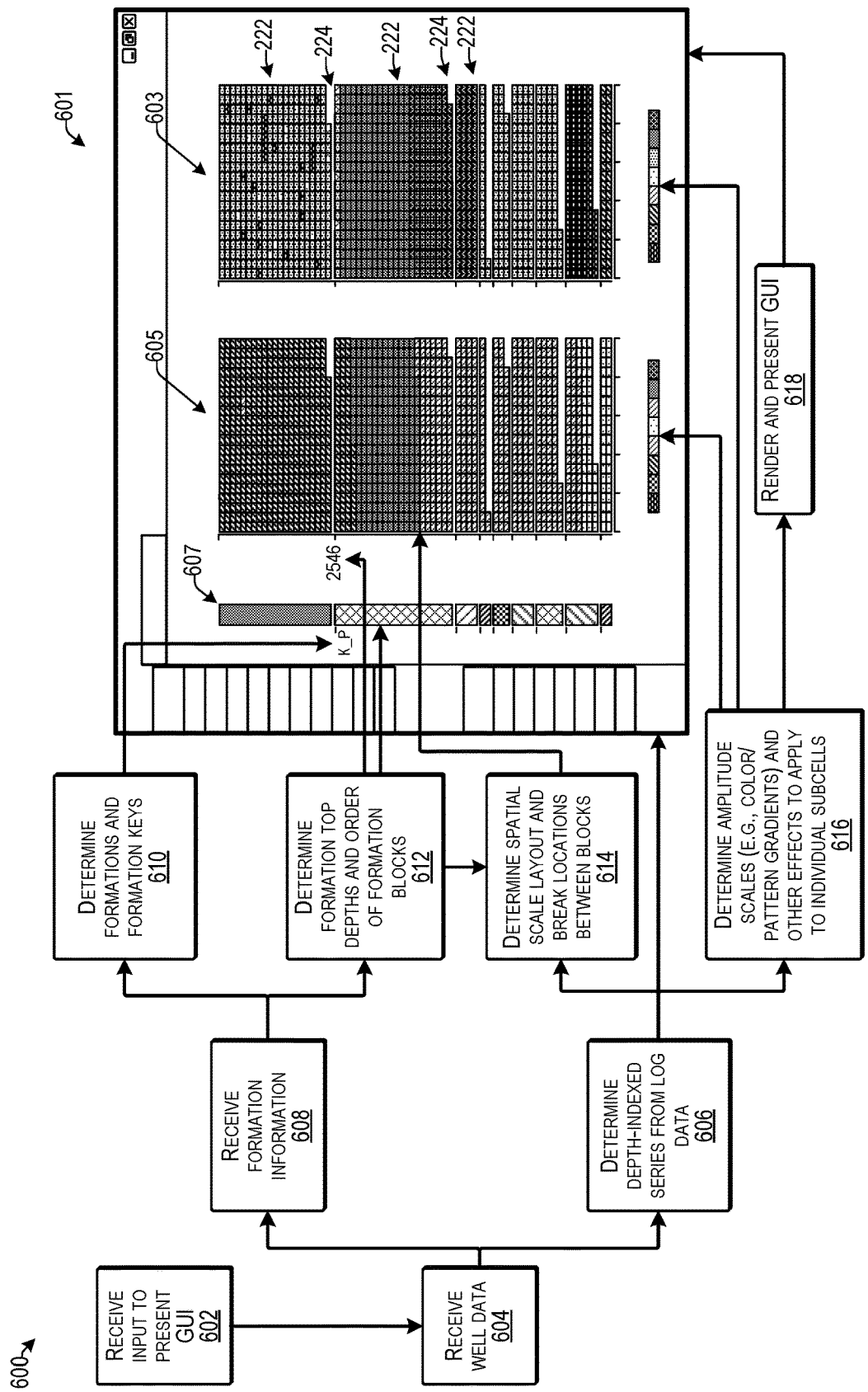
FIG. 6 is a flow diagram illustrating an example process for generating a GUI according to some implementations.

FIG. 6 includes a flow diagram illustrating an example process according to some implementations. The process is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures, and the like, that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems.

FIG. 6 is a flow diagram illustrating an example process 600 for generating a GUI according to some implementations. In some examples, the process 600 may be executed by the visualization computing device(s) 102 or other suitable computing device(s) by executing the data visualization program, such as for generating a GUI 601 or other well log visualization GUIs. The flow diagram includes a plurality of operations for generating and presenting the GUI 601 with visualizations 603 and 605 of well log data and a visualization 607 of formations according to some implementations herein. In some examples, the GUI 601 may correspond to the GUI 200 discussed above with respect to FIG. 2. In other examples, the GUI 601 may correspond to other GUIs that may be generated using the techniques described herein.

At 602, the computing device may receive an input to cause the computing device to generate the GUI 601. For example, the user of the visualization computing device may make a user input to cause the GUI 601 to be presented. In other examples, the input may come from another application or computer program, or through other type of triggering event.

At 604, the computing device may access or otherwise receive log data for one or more specified wells or log data specified by or otherwise associated with the input.

At 606, the computing device may determine one or more depth-series data from the log data. For example, the computing device may receive a LAS file, as discussed above with respect to FIG. 4, and may read the depth series data from various logs included in the LAS file. The depth series log data from the LAS file may be used for generating one or more log data visualizations 603 and/or 605.

At 608, the computing device may receive formation depth information and formation keys. For example, the computing device may access the formation information data structure 124 discussed above with respect to FIG. 5, such as for determining formation types, formation depths, formation keys and so forth.

At 610, the computing device may determine formations and formation keys for the well, e.g., based on the well location.

At 612, the computing device may determine formation top depths and order of formation blocks when a formation block visualization 607 is to be presented in the GUI.

At 614, the computing device may determine spatial scale layout and break locations between blocks. For example, based on the formation top information and depth information from 612, the computing device may determine the locations of breaks 224 between respective blocks 222 of cells. Further, the computing device may determine a layout of the log data visualization based on the total depth, the number of formations, and a desired level of granularity. As mentioned above, a default setting may be 20 cells per row and ten subcells per cell, but the default may be adjusted by the user or by the data visualization program, such as in the case of an extremely deep or shallow well, a large number of different formations, or the like. In addition, in some cases, the computing device may determine the parameter value for each subcell that will be presented in the GUI 601. In other cases, if the subcell values have already been determined, the subcell values may be retrieved from a subcell value data structure, as discussed additionally below, rather than having to recompute the subcell values each time the GUI is rendered.

At 616 the computing device may determine amplitude scales (e.g., color gradients, cross-hatching or shading gradients, brightness gradients, and so forth) for graphic effects to apply to individual subcells. As one example, the computing device may determine the amplitude scale for each visualization based on a low end and high end of the respective measured parameter in the log data. In some examples, amplitude scales, such as color scales, may be computed for each log to ensure that outliers do not skew the scale gradient, which might make the rest of the values indistinguishable. This can be achieved in various different ways. For instance, colors or other graphic effects can be mapped to percentile values of the log (e.g., one color or graphic pattern for 10 to 15 percentile). Outliers may then fall into a single color or pattern (e.g., 99 to 100 percentile for high outliers), and may be highlighted with a unique border around the subcell, or other graphically distinguishing feature. Additionally, in some examples, colors or patterns may be mapped using Jenks natural breaks optimization (see, e.g., Jenks, George F. 1967. "The Data Model Concept in Statistical Mapping", International Yearbook of Cartography 7: 186-190), a clustering technique used to define optimal color scale for parameter mapping, or various other clustering techniques.

At 618, the computing device may render and present the GUI according to the determined layout and amplitude scales determined above. The continuity of the cell layout is broken at each formation top by the breaks 224 such that cells belonging to a respective formation are arranged in a single group as a block 222 of cells. The overall width of the visualizations 603 and 605 can also be configured by the user depending on the depth interval represented in a single line. As one non-limiting example, for a line accounting for 100 feet of depth, the visualization may include 100/5=20 cells per line, and, with each cell corresponding to 5 feet of depth and each subcell corresponding to a half foot of depth. Thus, the average value of the depth signal in each 0.5 foot window (or other selectable unit of depth) can be represented in each sub-cell colored, patterned, etc., according to the defined amplitude graphic effect scale. In addition, in the case of missing log data values (e.g., corresponding to "−999.25" in the logs in FIG. 4) the corresponding subcells may be distinguished, such as by being presented in gray, being blacked out, or the like. The technique discussed above may be employed for a particular well or well log, or may be employed for presenting logs from multiple different cells side by side to enable comparison of results from two or more wells.

Figure 7:
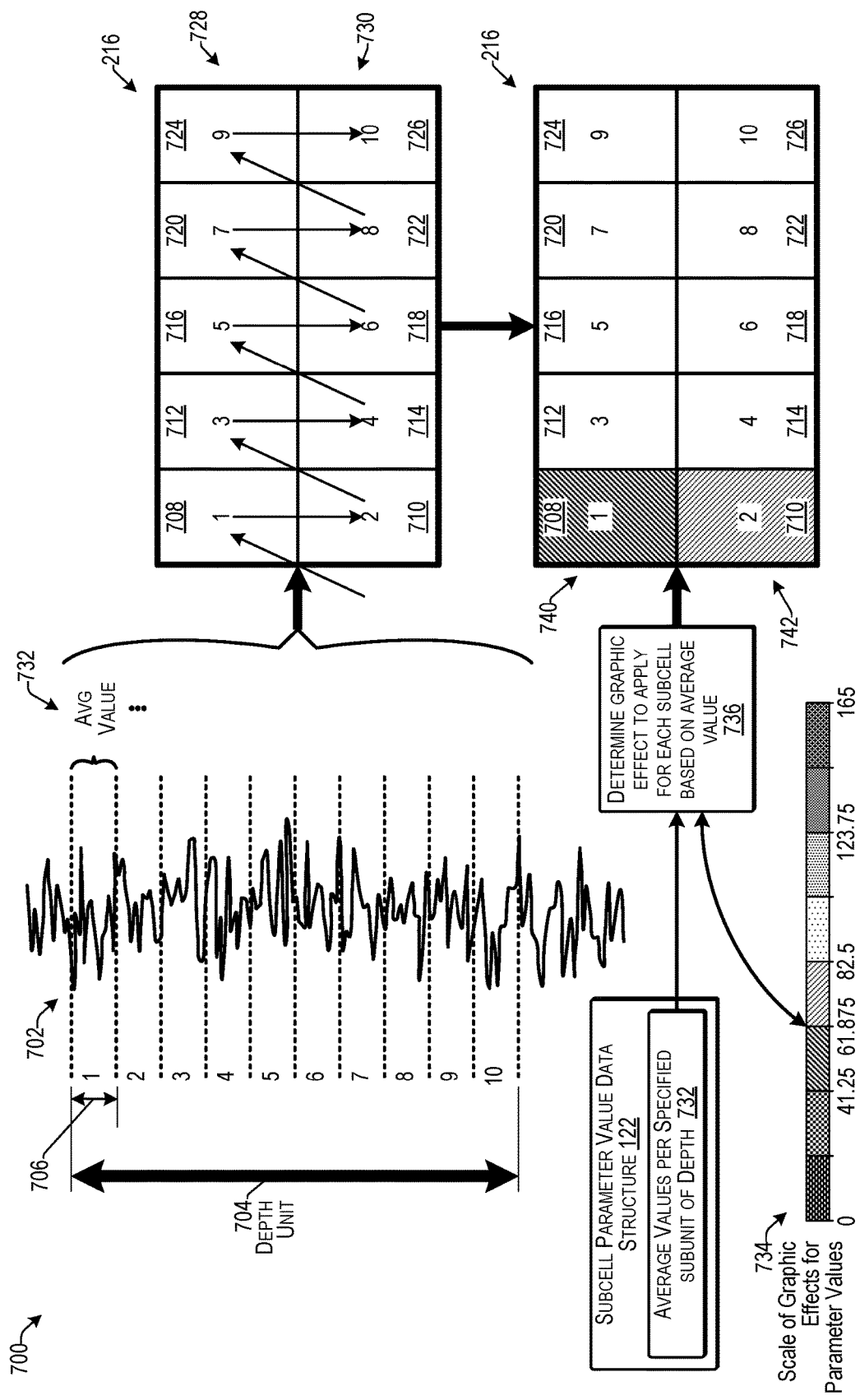
FIG. 7 illustrates an example of determining subcell values for subcells of a cell according to some implementations.

FIG. 7 illustrates an example 700 of determining subcell values for subcells of a cell according to some implementations. In this example, a signal 702 received from a sensor has an amplitude that varies in the horizontal direction, as illustrated, from a lower value on the left to a larger value on the right. The signal 702 may correspond to a measured parameter of log data such as measured gamma ray values, CCL location values, line tension values, resistivity, and so forth. Furthermore, the signal 702 is correlated to a distance or depth of sensor travel, which may be divided into a plurality of units, as indicated by arrow 704, each of which may correspond to a cell 216 to be generated in a corresponding GUI. For example, as discussed above with respect to FIG. 1, as a sensor is moved inside a well borehole, the measured amplitude of the sensor signal may vary with the change in depth.

As enumerated elsewhere herein, the depth unit 704 may be selected by the user or by default, and may be a number feet, a number meters, or the like. In this example, suppose that the depth unit is five feet, although implementations herein are not limited to any particular depth unit. In addition, the depth unit 704 may be divided into a plurality of subunits 706, each corresponding to a subcell of the cell 216. In this example, the depth unit 704 is divided into 10 subunits 706, although more or fewer subunits may be used in other examples. Accordingly, if the depth unit 704 is five feet, then each subunit 706 may correspond to 0.5 feet, and the cell 216 may be divided into 10 subcells 708, 710, 712, 714, 716, 718, 720, 722, 724, and 726.

Furthermore, in this example, the cell 216 includes a stacked arrangement of the subcells 708-726 in which the subcells 708-726 alternate between an upper row 728 and a lower row 730. In FIG. 7, the 10 subunits 706 are each assigned a number 1 through 10, and these numbers 1-10 are reflected in the subcells 708-726 of the cell 216 to show the corresponding subcell to which the corresponding sensor signal parameter value is assigned. Thus, the sensor signal parameter values go from the upper row 728 to the subcell immediately below in the lower row 730, and then back to the next subcell in the upper row in a zigzag pattern, as illustrated. This arrangement provides a compact visualization of the sensed parameter information corresponding to the subunits 706. Alternatively, in other examples, other arrangements of the subcells, such as a single row of subcells, may be used. Additionally, other patterns may be used for assigning the sensor signal values to the respective subcells. For example, the upper row 728 of subcells may be populated entirely before populating the lower row 730 of subcells, and so forth.

To generate a visualization of the sensor signal 702, the visualization computing device may determine an average value 732 of the signal measured over each 0.5 foot window, such as an average of the sensor signal amplitude measured over each subunit 706. The average values 732 of the subunits 706 may be correlated to a graphic effect to be displayed within the depicted cell layout of each respective subcell of each cell 216. In addition, the average values 732 of the subunits 706 may be stored in the subcell parameter value data structure 122. Accordingly, the subcell parameter value data structure 122 may be used subsequently each time a visualization of the respective sensor data is desired, without having to recompute the average sensor values for the respective sensor data.

To determine the graphic effect to apply to individual subcells, the computing device may determine an upper limit and a lower limit of the sensor signal amplitude, and may apply these limits to a scale 734 of graphic effects for the parameter values. As mentioned above, in some examples, amplitude color scales or other graphic effects scales may be determined for each data log to ensure that outliers do not skew the scale gradient, which might otherwise make the rest of the average sensor values indistinguishable. This can be achieved in various different ways. As one example, colors or other graphic effects can be mapped to percentile values of the sensor data (e.g., one color or graphic pattern for 10 to 15 percentile). Outliers may then fall into a single color or pattern (e.g., 99 to 100th percentile for high outliers), and, in some cases, may be highlighted with unique border around the subcell, or other graphically distinguishing feature. Additionally, in some examples, colors or patterns may be mapped using Jenks natural breaks optimization or various other clustering techniques.

In this example, suppose that the sensor signal amplitude may vary between a range of 0 and 165, and that the scale 734 is divided into eight different graphic effects, such as eight different graphic patterns. As indicated at 736, the computing device may determine the graphic effect to apply to each subcell 708-726 based on the average value per specified subunit of depth 732 in the subcell parameter value data structure 122. As an example, suppose that the average amplitude value 732 of the signal 702 for the first subunit is 60.05. Accordingly, as indicated at 740, the computing device may apply to the first subcell 708 the graphic effect from the scale 734 assigned to values between 41.25 and 61.875. Similarly, suppose that the average amplitude value 732 of the signal 702 for the second subunit is 62.55. Thus, as indicated at 742, the computing device may apply to the second subcell 710 the graphic effect from the scale 734 assigned to values between 61.875 and 82.5. Accordingly, when presenting the visualization of the log data corresponding to the sensor signal 702, the computing device may populate all of the subcells and cells as discussed above.

Additionally, while the scale 734 is illustrated in this example as being divided into eight distinct graphic effects, more or fewer divisions may be used in other examples. For instance, in some cases, the scale 734 may be a gradient with no clear demarcations between graphic effects, such as a gradient of one or more colors, a grayscale gradient from dark to light, or vice versa, a brightness gradient, and so forth. Numerous other variations will be apparent to those of skill in the art having the benefit of the disclosure herein.

Figure 8:
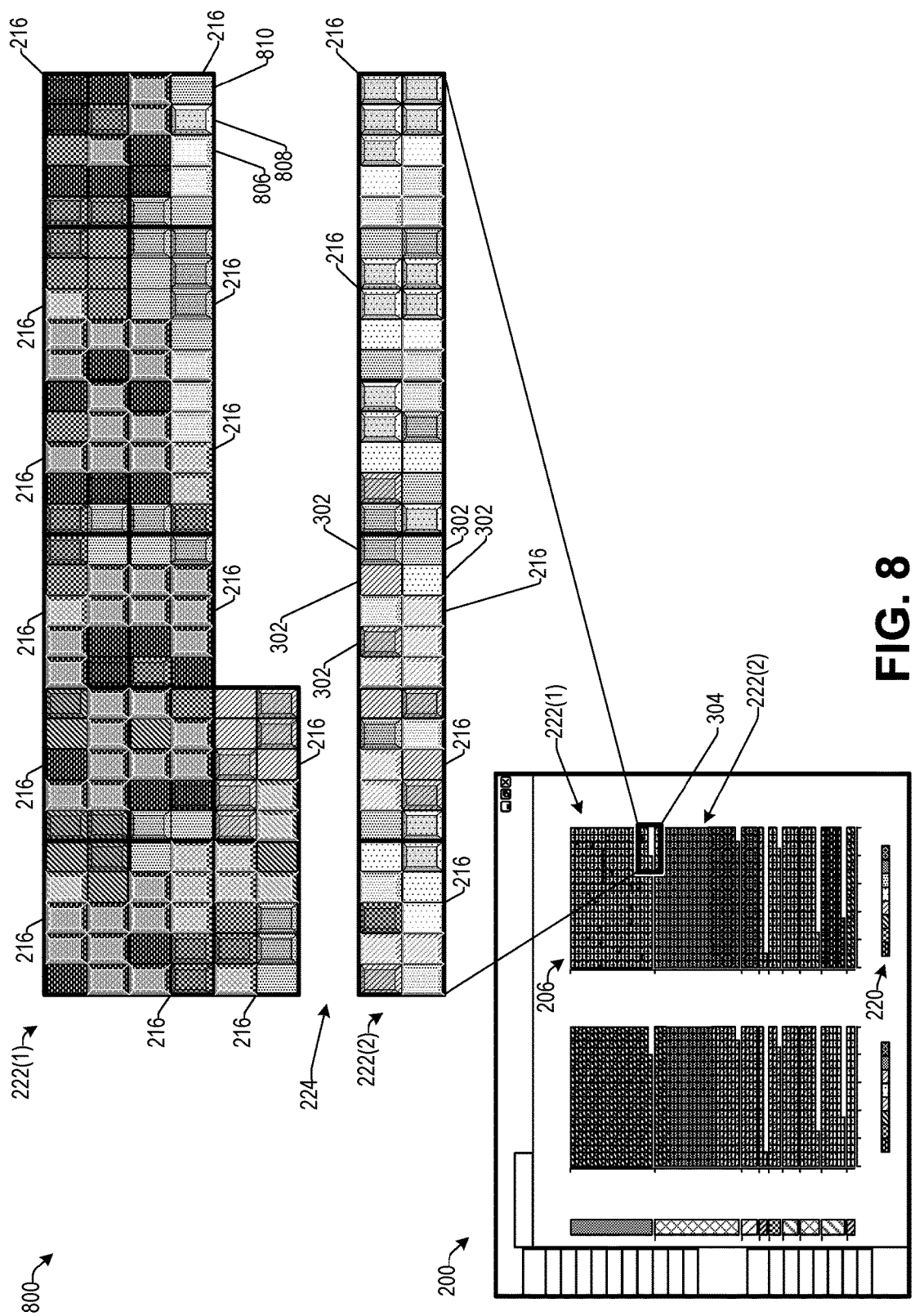
FIG. 8 illustrates an enlarged view of applying additional graphic effects to the subcells to convey additional information according to some implementations.

FIG. 8 illustrates an enlarged view 800 of applying additional graphic effects to the subcells to convey additional information according to some implementations. As mentioned above, each cell 216 may include a plurality of subcells 302. In this example, each cell 216 includes 10 subcells 302, with an upper row of five subcells 302 and a lower row of five subcells 302 in each cell 216. Additionally, in other examples, the number of subcells may be 2, 4, 6, 8, 12, or so forth. Alternatively, other examples, there may be a single row of subcells 302 per cell 216, and thus an odd or even number of subcells 302 per cell.

In this example, the enlarged view 800 corresponds to a rectangle 804 shown on the GUI 200 overlapping the visualization 206 discussed above with respect to FIG. 2. The rectangle 804 overlaps a first block 222(1) and a second block 222(2) of the visualization 206. The enlarged view 800 further shows that there is a break 224 between the last row of the first block 222(1) and the first row of the second block 222(2), which serves as an indicator to indicate that the first row of the second block 222(2) is the beginning of a new (different) geological formation. As mentioned above, the graphic effect selected for each subcell 302 may correspond to a parameter value (e.g., an average amplitude of a sensor signal in some cases) measured at a window of depth corresponding to the respective subcell 302, which may also be indicated by the scale 220 or other scale corresponding to the respective log visualization.

In this example, the additional graphic effects may be used to indicate a trend of parameter values of the log data, such as for indicating an upward trend, a downward trend, a stable trend, etc., of the parameter value. As one example, for the sensor signal value at a first depth, there may be no graphic effect applied. For every other depth and corresponding subcell, the computing device may determine the parameter value of the sensor signal for the subcell and may determine a difference between the parameter value of the sensor signal at the immediately previous subcell (depth) and the parameter value of the current cell to obtain a resulting value. If the resulting value is positive (up), a first additional graphic effect may be applied to the subcell in addition to the graphic effect indicative of the parameter value. For instance, as illustrated at 806, the first additional graphic effect may be an emboss effect that shows the subcell in a raised state.

Similarly, if the resulting value is negative (down), a second additional graphic effect may be applied to the subcell in addition to the graphic effect indicative of the parameter value. For instance, as illustrated at 808, the second additional graphic effect may be a deboss effect that shows that subcell in a depressed or lowered state. Furthermore, if the resulting value is zero, a third graphic effect or no graphic effect might be applied to the respective subcell, as illustrated at 810. Additionally, in some cases, rather than merely not being equal to zero, a minimum threshold may be required to be exceeded to show an upward trend or lowering trend. For example, the resulting value may be required to more or less than 5 percent of the previous parameter value to show an upward or downward trend, respectively, and otherwise the trend may be displayed as stable. Numerous other variations will be apparent to those of skill in the art having the benefit of the disclosure herein.

Figure 9:
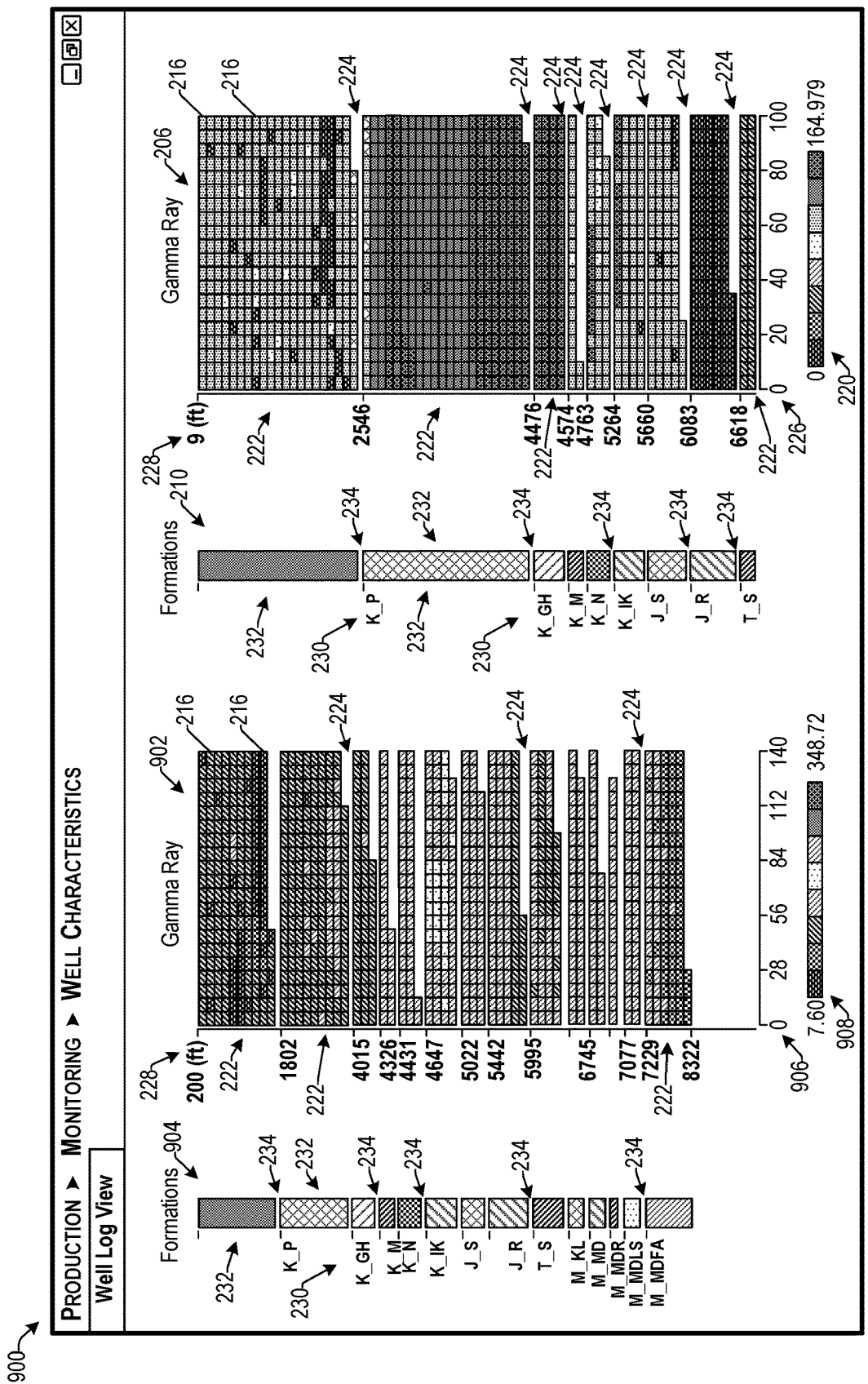
FIG. 9 illustrates an example GUI for comparing a parameter for two different wells concurrently according to some implementations.

FIG. 9 illustrates an example GUI 900 for comparing a parameter from two different wells concurrently according to some implementations. In this example, the user may select a first well and a second well, and may select a parameter to be displayed for the respective selected wells. For instance, as one of the wells, suppose that the user selects the well discussed above with respect to FIG. 2, and the gamma ray log parameter, which causes the computing device to present the gamma ray visualization 206 and the associated formation visualization 210 discussed above with respect to FIG. 2. In addition, suppose that the user also selects a second well, which causes the computing device to present a second gamma ray visualization 902 and a second formation visualization 904.

In this example, the second well has a depth that is substantially deeper than that of the first well. Accordingly, the scale of the visualizations 902 and 904 for the second well may be different from that of the visualizations 206 and 210 for the first well. In this example, as indicated at 906, each row of the visualization 902 may correspond to 140 feet, rather than 100 feet as in the visualization 206. Thus, as illustrated, each of 20 cells 216 in each row of the visualization 902 may correspond to seven feet of depth, rather than five feet. Alternatively, the cells 216 may correspond to five feet of depth and each row of the visualization 902 may include 28 cells rather than 20 (not shown in this example). Other variations will also be apparent to those of skill in the art having the benefit of the disclosure herein.

Furthermore, the visualization 904 may include a graphic effect scale 908 that includes the same graphic effects as the scale 220 associated with the visualization 206. This enables a like-to-like comparison of the two visualizations 206 and 904, even though the scales 908 and 220 may have entirely different upper and lower parameter values. Thus, implementations herein may enable side-by-side comparison of gamma ray data collected using different techniques and/or different sensor types.

In addition, the formation visualization 904 may be presented in a manner similar to that discussed above for the formation visualization 210. For example, formations having the same formation name and/or key may be presented using the same graphic effects, such as the same color, same pattern, etc. Furthermore, while two visualizations are presented for side-by-side comparison in this example, in other examples, three or more visualizations may be presented side-by-side, depending in part on display screen size and/or resolution.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as programs stored on computer-readable media, and executed by the processor(s) herein. Generally, programs include computer-readable instructions, routines, modules, applications, objects, components, data structures, executable code, etc., for performing particular tasks or implementing particular abstract data types. These programs and the like may be executed as native code or may be downloaded and executed, such as in a virtual machine or other just-in-time compilation execution environment. Typically, the functionality of the programs may be combined or distributed as desired in various implementations. An implementation of these programs and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
   a display;
   one or more processors in communication with the display; and
   one or more non-transitory computer-readable media maintaining executable instructions, which, when executed by the one or more processors, program the one or more processors to perform operations comprising:
      receiving log data including depth-series data for a parameter corresponding to a well;
      receiving formation information for the well;
      determining an average parameter value of the depth series data for individual subunits of depth over a larger unit of depth;
      determining a scale of graphic effects corresponding to parameter values between a low parameter value and a high parameter value; and
      presenting, on the display, a visualization of the depth-series data, the visualization including a plurality of cells arranged in a plurality of rows, each cell corresponding to the larger unit of depth and including a plurality of subcells corresponding to the subunits of depth, each subcell presented with a respective graphic effect corresponding to a parameter value determined at a corresponding depth, the graphic effect corresponding to the parameter value on the scale of graphic effects, the visualization further including, based on the formation information, an indicator between a first plurality of the rows and a second plurality of the rows to indicate a change in geological formation.

2. The system as recited in claim 1, the operations further comprising:
   determining, based on the formation information, a plurality of formations corresponding to the well; and
   grouping the cells according to the plurality of formations based on a depth associated with each cell and each formation.

3. The system as recited in claim 2, the operations further comprising including the indicator between each group of cells, wherein the indicator includes at least one of a space between each group of cells or a line between each group of cells.

4. The system as recited in claim 1, the operations further comprising:
   receiving a sensor signal as the depth series of data, the sensor signal corresponding to the parameter and including an amplitude; and
   determining the average parameter value of the depth series data for individual subunits of depth over a larger unit of depth by determining an average of the amplitude over each individual unit of depth.

5. The system as recited in claim 2, the operations further comprising presenting, on the display, a formation visualization concurrently with the visualization of the depth series data, the formation visualization including a plurality of blocks corresponding to respective geological formations, wherein the plurality of blocks are arranged in order of the respective geological formations according to depth, wherein lines or spaces are included between the blocks to indicate a change in formation.

6. The system as recited in claim 1, the operations further comprising:
   for a first subcell, determining a difference between the average parameter value for the first subcell and the average parameter value for an immediately previous subcell; and
   including an additional graphic effect based on the difference when presenting the first subcell on the display.

7. The system as recited in claim 1, wherein the well is a first well, the operations further comprising:
   receiving log data for the parameter for a second well; and
   presenting a second visualization on the display concurrently with the first visualization, the second visualization including a plurality of rows of cells having subcells including graphic effects determined based on the log data for the second well.

8. A method comprising:
   receiving, by one or more processors, log data including depth-series data for a parameter corresponding to a well;
   determining a parameter value of the depth series data for individual subunits of depth over a larger unit of depth;
   determining a scale of graphic effects corresponding to parameter values for the depth-series data; and
   presenting, on a display, a visualization of the depth-series data, the visualization including a plurality of cells arranged in a plurality of rows, each cell corresponding to the larger unit of depth and including a plurality of subcells corresponding to the subunits of depth, each subcell presented with a respective graphic effect corresponding to the parameter value determined at a corresponding depth, the graphic effect corresponding to the parameter value on the scale of graphic effects.

9. The method as recited in claim 8, further comprising:
   receiving formation information for the well; and
   presenting the visualization to include, based on the formation information, an indicator between a first plurality of the rows and a second plurality of the rows to indicate a change in geological formation.

10. The method as recited in claim 9, further comprising:
    determining, based on the formation information, a plurality of formations corresponding to the well;
    grouping the cells according to the plurality of formations based on a depth associated with each cell and each formation; and
    including the indicator between each group of cells, wherein the indicator includes at least one of a space between each group of cells or a line between each group of cells.

11. The method as recited in claim 9, further comprising presenting, on the display, a formation visualization concurrently with the visualization of the depth-series data, the formation visualization including a plurality of blocks corresponding to respective geological formations, wherein the plurality of blocks are arranged in order of the respective geological formations according to depth, wherein lines or spaces are included between the blocks to indicate a change in formation.

12. The method as recited in claim 8, further comprising:
receiving a sensor signal as the depth series of data, the sensor signal corresponding to the parameter and including an amplitude; and
determining the parameter value of the depth-series data for individual subunits of depth by determining an average of the amplitude over each individual unit of depth.

13. The method as recited in claim 8, further comprising:
for a first subcell, determining a difference between the parameter value for the first subcell and the parameter value for an immediately previous subcell; and
including an additional graphic effect based on the difference when presenting the first subcell on the display.

14. The method as recited in claim 8, wherein the well is a first well, the method further comprising:
receiving log data for the parameter for a second well; and
presenting a second visualization on the display concurrently with the first visualization, the second visualization including a plurality of rows of cells having subcells including graphic effects determined based on the log data for the second well.

15. One or more non-transitory computer-readable media storing instructions which, when executed by one or more processors, program the one or more processors to:
receive log data including a depth-series of data for a parameter;
determine a parameter value of the depth series data for individual subunits of depth corresponding to a larger unit of depth;
determine a scale of graphic effects corresponding to parameter values for the depth-series data; and
present, on a display, a visualization of the depth-series data, the visualization including a plurality of cells arranged in a plurality of rows, each cell corresponding to the larger unit of depth and including a plurality of subcells corresponding to the subunits of depth, each subcell presented with a respective graphic effect corresponding to the parameter value determined at a corresponding depth, the graphic effect corresponding to the parameter value on the scale of graphic effects.

16. The one or more non-transitory computer-readable media as recited in claim 15, wherein:
the depth-series data is for a well, and
the one or more processors are further programmed to:
receive formation information for the well; and
present the visualization to include, based on the formation information, an indicator between a first plurality of the rows and a second plurality of the rows to indicate a change in geological formation.

17. The one or more non-transitory computer-readable media as recited in claim 16, wherein the one or more processors are further programmed to:
determine, based on the formation information, a plurality of formations corresponding to the well;
group the cells according to the plurality of formations based on a depth associated with each cell and each formation; and
include the indicator between each group of cells, wherein the indicator includes at least one of a space between each group of cells or a line between each group of cells.

18. The one or more non-transitory computer-readable media as recited in claim 16, wherein the one or more processors are further programmed to present, on the display, a formation visualization concurrently with the visualization of the depth-series data, the formation visualization including a plurality of blocks corresponding to respective geological formations, wherein the plurality of blocks are arranged in order of the respective geological formations according to depth, wherein lines or spaces are included between the blocks to indicate a change in formation.

19. The one or more non-transitory computer-readable media as recited in claim 15, wherein the one or more processors are further programmed to:
receive a sensor signal as the depth series of data, the sensor signal corresponding to the parameter and including an amplitude; and
determine the parameter value of the depth-series data for individual subunits of depth by determining an average of the amplitude over each individual unit of depth.

20. The one or more non-transitory computer-readable media as recited in claim 15, wherein the one or more processors are further programmed to:
for a first subcell, determine a difference between the parameter value for the first subcell and the parameter value for an immediately previous subcell; and
include an additional graphic effect based on the difference when presenting the first subcell on the display.

* * * * *